US007021164B2

(12) United States Patent
Fenkanyn

(10) Patent No.: US 7,021,164 B2
(45) Date of Patent: Apr. 4, 2006

(54) TIRE SENSOR INSERTION TOOL AND METHOD

(75) Inventor: John Michael Fenkanyn, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 23 days.

(21) Appl. No.: 10/639,672

(22) Filed: Aug. 12, 2003

(65) Prior Publication Data

US 2005/0034546 A1 Feb. 17, 2005

(51) Int. Cl.
*G01D 21/00* (2006.01)

(52) U.S. Cl. ........................................ 73/866.5; 73/146

(58) Field of Classification Search ............... 73/866.5, 73/146; 374/208, 209; 81/466
See application file for complete search history.

(56) References Cited

U.S. PATENT DOCUMENTS

| | | | | |
|---|---|---|---|---|
| 3,197,849 | A | 8/1965 | Johnson | 29/203 |
| 3,678,751 | A * | 7/1972 | Mead et al. | 338/28 |
| 3,897,272 | A * | 7/1975 | Medlar | 136/230 |
| 3,991,615 | A * | 11/1976 | Hornung | 338/28 |
| 4,133,208 | A * | 1/1979 | Parlanti | 374/165 |
| 4,171,565 | A | 10/1979 | Boudreau | 29/739 |
| 4,537,071 | A * | 8/1985 | Waterman | 73/866.5 |
| 5,106,580 | A * | 4/1992 | Mudiam | 73/866.5 |
| 5,770,809 | A * | 6/1998 | Waterman | 73/866.5 |
| 6,203,493 | B1 * | 3/2001 | Ben-Haim | 600/117 |
| 6,461,038 | B1 * | 10/2002 | Pellegrini et al. | 378/191 |
| 2002/0072661 | A1 * | 6/2002 | Wiesmann et al. | 600/328 |
| 2004/0019293 | A1 * | 1/2004 | Schweitzer et al. | 600/549 |
| 2005/0066780 | A1 * | 3/2005 | Kobert et al. | 81/466 |

FOREIGN PATENT DOCUMENTS

| | | |
|---|---|---|
| EP | 0086418 | 8/1983 |

* cited by examiner

*Primary Examiner*—Hezron Williams
*Assistant Examiner*—Nashmiya Fayyaz
(74) *Attorney, Agent, or Firm*—Richard B. O'Planick

(57) ABSTRACT

A tool for insertion of a sensor to a predetermined depth within a bore includes an elongate tool tip terminating at a tip end, a handle affixed to the tip, and an axial passageway extending through the tip and handle to a tool end. A window is provided extending transversely into the tool tip at a location between the tip end and the handle and provides visual access to the passageway. The tool is capable of use in two modes of operation. In a first mode, a bore is drilled into an object body such as a tire to the required depth. The sensor leads are fed through the tip of the tool and pulled through the handle until the sensor touches the tip of the tool. Thereafter, the tip of the tool with the sensor is inserted into the pre-formed bore. The tool tip is then removed out of the bore, leaving the sensor within the bore at the pre-determined desired depth. In the second mode of operation, the tip of the tool is inserted into the pre-drilled bore and a thermocouple is inserted into the bore via the axial passageway extended through the tool tip and handle. The progress of the thermocouple insertion is tracked through the window. A marking or other indicia may be placed on the trailing leads of the thermocouple at a predetermined spacing from the thermocouple. Visual identification of the arrival of the indicia at the tool tip window indicates a successful insertion of the thermocouple to its intended depth. Thereafter the tool tip is removed, leaving the thermocouple within the bore at the predetermined, optimal depth.

13 Claims, 11 Drawing Sheets

TIRE SENSOR INSERTION TOOL AND METHOD

FIELD OF THE INVENTION

The invention relates generally to a tool for positioning a sensor within an elongate bore and, more specifically, to a tool and method for inserting a tire sensor or other electronic measuring device to a predetermined depth within a tire bore.

BACKGROUND OF THE INVENTION

It is desirable to monitor physical properties of a tire during test procedures in order to ascertain and measure certain tire performance characteristics such as temperature. Certain tests involve taking temperature measurements of a tire tread by imbedding a temperature sensor or thermocouple into the tread region of the tire. To conduct such tests, a bore is drilled into the tread region and the sensor or thermocouple is inserted into the bore. It is, however, very difficult to insert a sensor, thermocouple, or other relatively fragile electronic device into rubber due to inherent properties of rubber that complicate such an insertion. Contact between the rubber tire and a device inserted therein may result in damage to the device or impede the progress of the device into the tire bore to an extent that prohibits the device from reaching its optimum depth. Moreover, it is difficult to determine when the device has reached its intended depth. Continued application of insertion force against the sensor after it reaches the terminal end of the bore can also result in sensor damage and consequent malfunction.

Accordingly, the industry has been in need of a tool that facilitates the insertion of a sensor or thermocouple into a bore to a desired depth. The tool should be durable to withstand repeated insertion cycles through tire regions including steel belts; convenient and easy to operate; readily and inexpensive to manufacture and repair should the need arise; and capable of providing mechanical advantage during repeated insertion cycles. The tool optimally will function to mechanically assist in the insertion of a sensor or thermocouple into a tire bore while safeguarding the structural and functional integrity of the device throughout the insertion process.

SUMMARY OF THE INVENTION

According to one aspect of the invention, a tool and method for insertion of a sensor to a predetermined depth within a bore includes an elongate tool tip terminating at a tip end, a handle affixed to the tip, and an axial passageway extending through the tip and handle to a tool end. The sensor leads are fed through the tip of the tool and pulled through the handle until the sensor touches the tip of the tool. Thereafter, the tip of the tool with the sensor is inserted into the pre-formed bore. The length of the tool tip is selected to correlate with the intended depth to which the sensor is optimally located within the bore. The tool tip is then removed out of the bore, leaving the sensor within the bore at the pre-determined desired depth. According to a further aspect of the invention, the tool may be used in an alternative mode of operation for the insertion of a thermocouple into the bore. In the second mode of operation, the tip of the tool is first inserted into the pre-drilled bore and a thermocouple is then inserted into the bore from a rearward end of the axial passageway extending through the tool tip and handle. According to a further aspect of the invention, a window is provided extending transversely into the tool tip at a location between the tip end and the handle and provides visual access to the passageway. The progress of the thermocouple along the axial passageway and into the bore may be tracked through the window. A mark or other indicia may be placed on the trailing leads of the thermocouple at a predetermined spacing from the thermocouple. Visual identification of the arrival of the indicia at the tool tip window indicates a successful insertion of the thermocouple to its intended depth. Thereafter the tool tip is removed, leaving the thermocouple within the bore at the predetermined, optimal depth. According to yet a further aspect of the invention, the tool tip may be formed as a durable, readily replaceable machined roll pin and the handle may be formed in a T-shape to provide mechanical advantage in rotation, insertion, and withdrawal of the tool tip within the pre-drilled bore.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
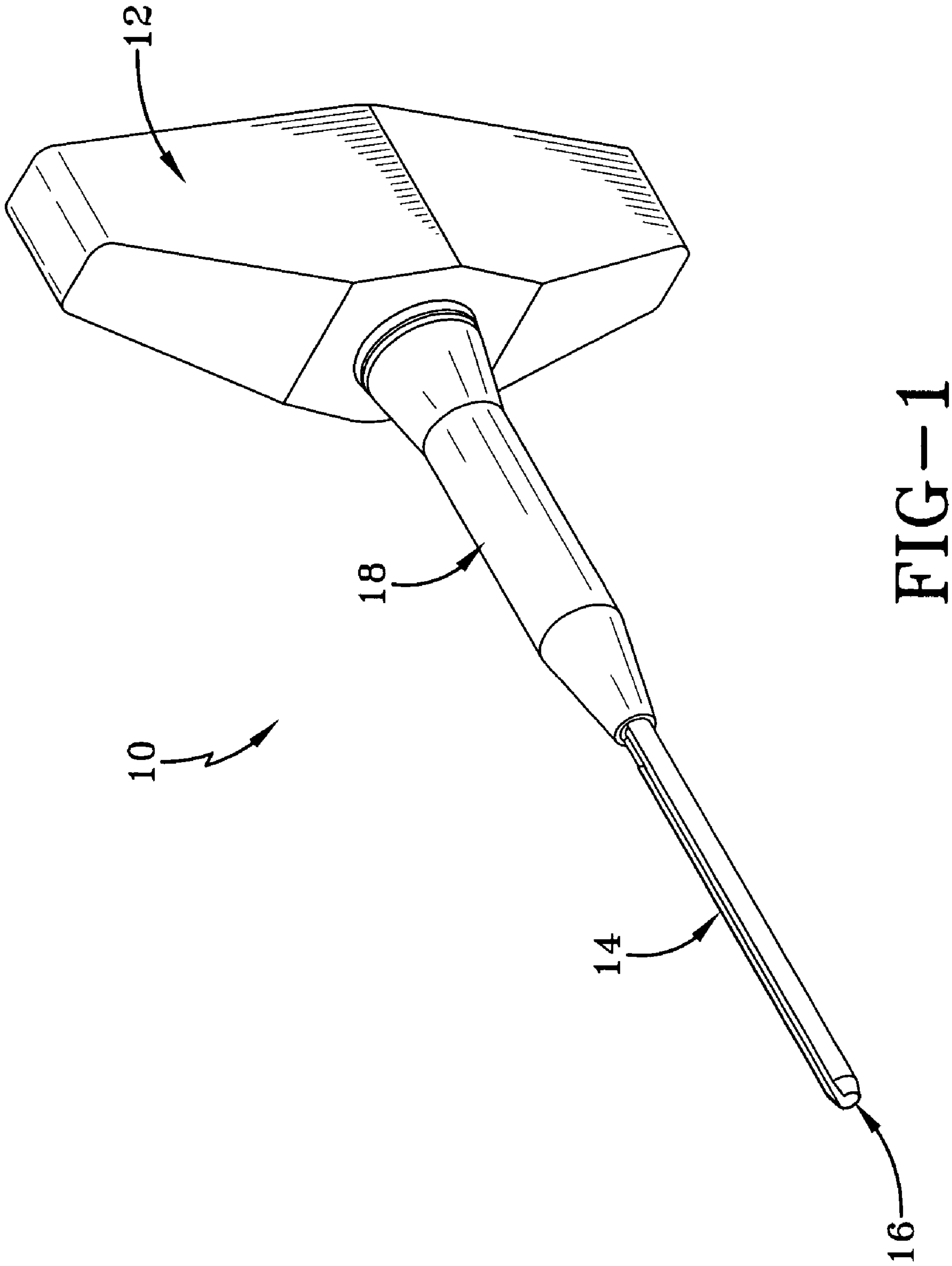
FIG. 1 is a front perspective view of the subject sensor insertion tool.
Figure 2:
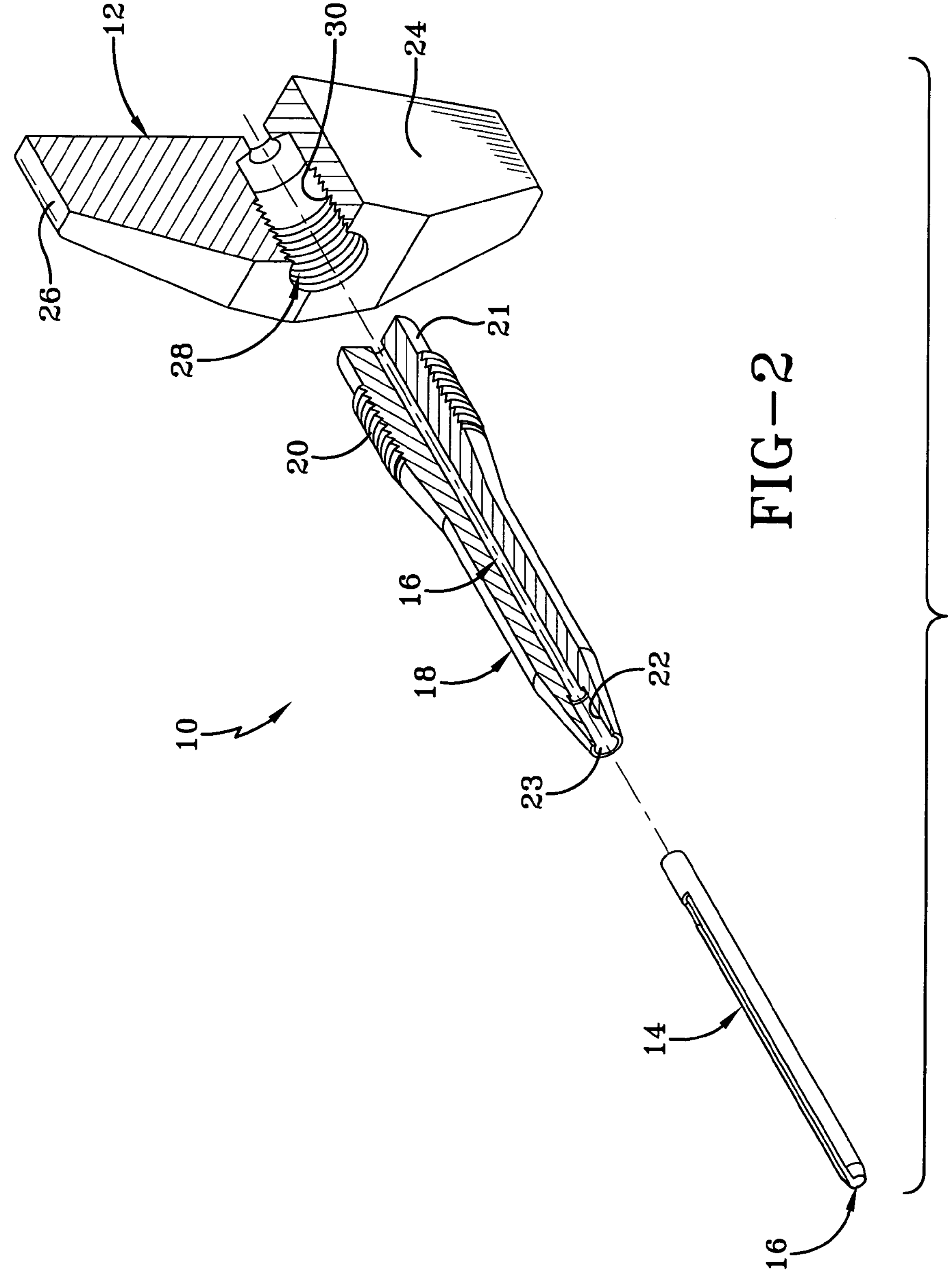
FIG. 2 is an exploded perspective view thereof shown in partial longitudinal section.
Figure 3:
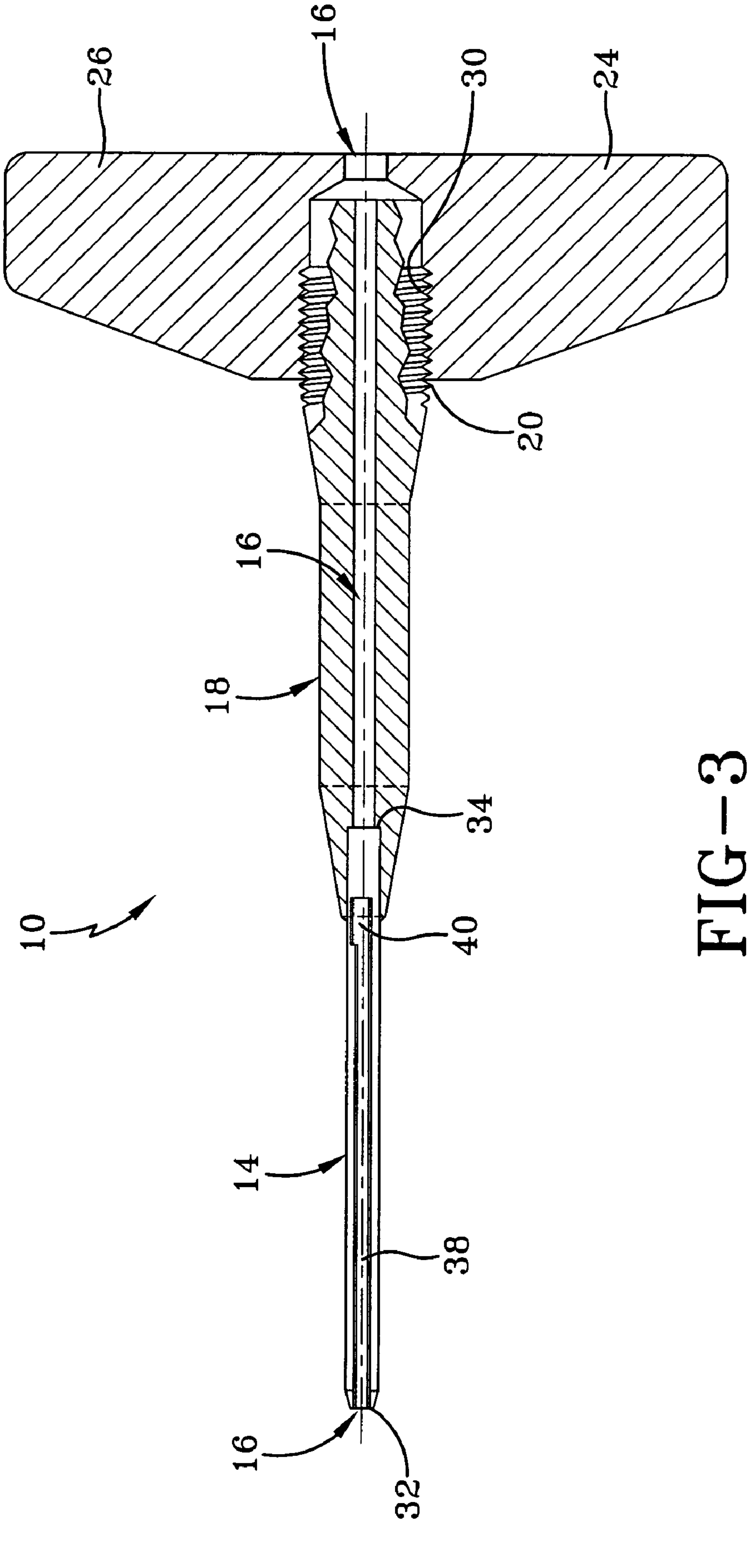
FIG. 3 is a longitudinal section view through the subject tool.

Referring initially to FIGS. 1, 2, and 3, the subject insertion tool 10 is shown to comprise a generally T-shaped handle 12 and an elongate tool tip 14. The handle 12 and tip 14 may be preferably formed from any suitable material such as steel. An axial passageway 16 extends through the handle 12 and the tip 14. The handle 12 comprises an elongate nose member 18 having circumferential screw threads 20 formed proximate a rearward end 21 and a socket 22 formed to extend into a forward end 23. A gripping portion of the handle 12 includes opposite wing grip flanges 24, 26. A socket 28 extends between the grip flanges 24, 26 coaxial with passageway 16. The socket 28 includes internal circumferential threads 30.

The tip member 14 is preferably formed as a machined roll pin extending between a forward tip end 32 and a rearward tip end 34. The pin body 36 is elongate and cylindrical and formed to provide an elongate slit 38 extending therein to the passageway 16. An enlarged portion 40 of the slit 38 is formed proximate the rearward tip end 34 and is referred to herein as a “window”. Window 40 provides and facilitates convenient visual access to the portion of pin passageway 16 adjacent the window for a purpose explained below.

Assembly of the tool proceeds as follows. The rearward end 21 of handle neck component 18 is inserted into the socket 28 as threaded engagement is established between threads 20 and 30. Rearward end 16 of the tip 14 is press fit into the socket 22 at the forward end 22 of the handle neck component 18. The pin member 14 may be replaced if necessary should it become damaged or otherwise disfunctional. In the assembled condition shown in FIGS. 1 and 4 the tool 10 is substantially T-shaped having elongate tip 18 projecting from the gripping handle. The flanges 24, 26 of handle 12 provide gripping protrusions and means for conveniently turning the tool into and out of engagement with a drilled bore as explained below.

Figure 4:
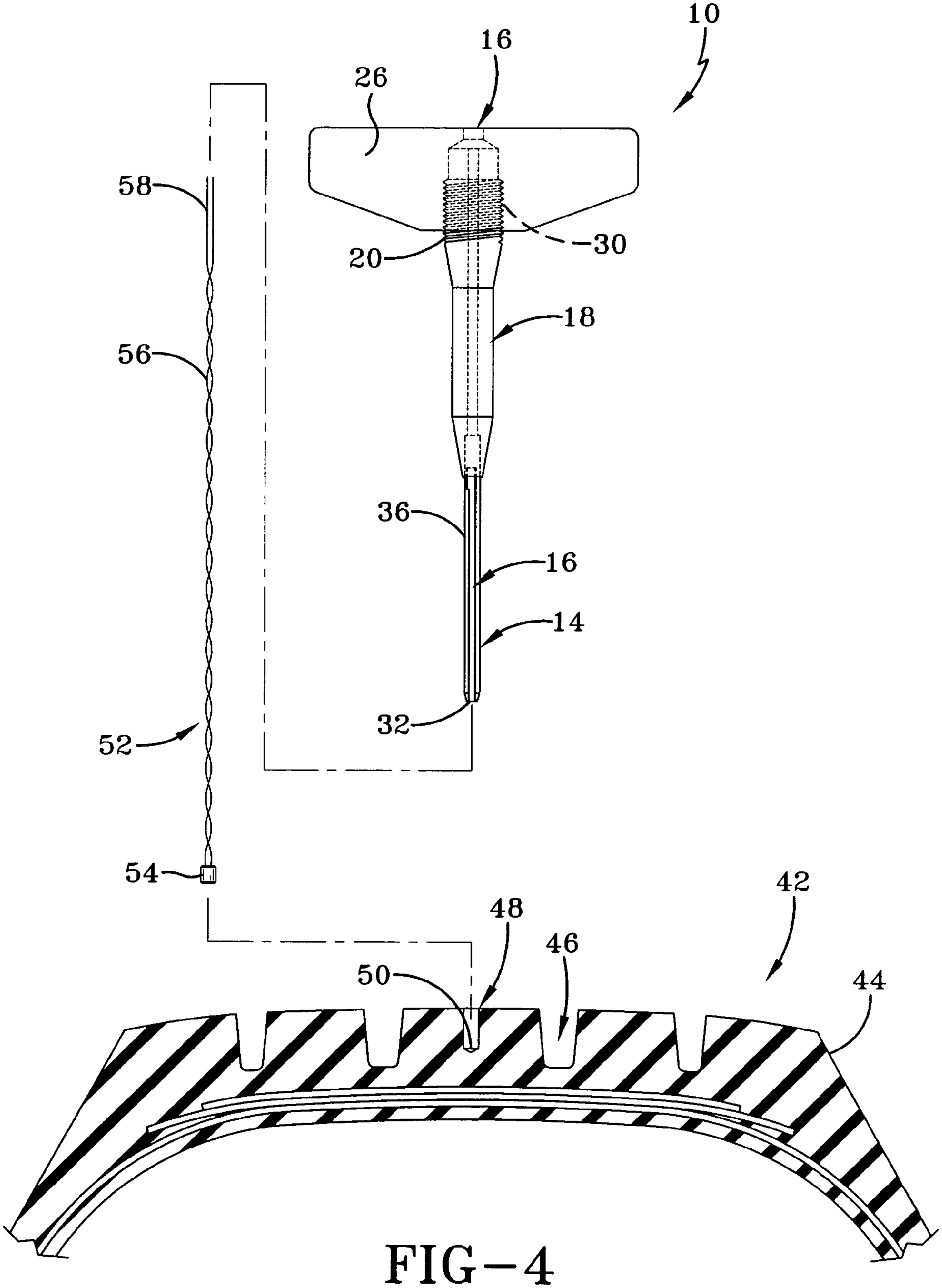
FIG. 4 is a schematic view of the sensor insertion sequence showing the tool, a tire tread region, and sensor in an initial orientation.

With reference to FIGS. 3 and 4, the subject tool, in a first mode of operation, finds application for the insertion of a sensor or thermocouple into a bore for the purpose of monitoring one or more physical parameters such as temperature. While the tool may be used in various applications, it finds particular utility in inserting a sensor or thermocouple into a bore formed in a tire tread 42. The tread 42 includes a particular region 44 of interest and is configured having a pattern of channels 46 in conventional manner. A bore 48 is formed by drilling or like operation into the region 44 to a predetermined, optimal depth. The bore 48 terminates at an internal surface 50. A sensor 50, such as a temperature sensor of a type common to the industry and commercially available, is intended for insertion into the bore 48 to the internal surface 50 and provides the means for monitoring the temperature of the tire tread as it undergoes testing cycles. While bore 48 is shown to terminate within the tread 42, the bore may be formed to extend deeper and through the tire belt(s) if desired in order to monitor the tire temperature at such a location.

FIG. 4 shows the subject tool 10 positioned relative to a sensor 52 and tire tread 42 at an initial stage of the insertion procedure. The sensor 52 comprises a (typically solid-state) transducer 54 of a type readily available in the industry. Electrical input and output to the transducer 54 is by means of leads 56 that extend from transducer 54 to lead free ends 58. Pre-insertion coupling of the sensor 52 to the tool 10 begins with the threading of sensor free ends 58 into the axial tool passageway 16 from the tip end 32. The sensor 52 is drawn through passageway 16 until the sensor body 54 seats against the tip end 32.

Figure 5:
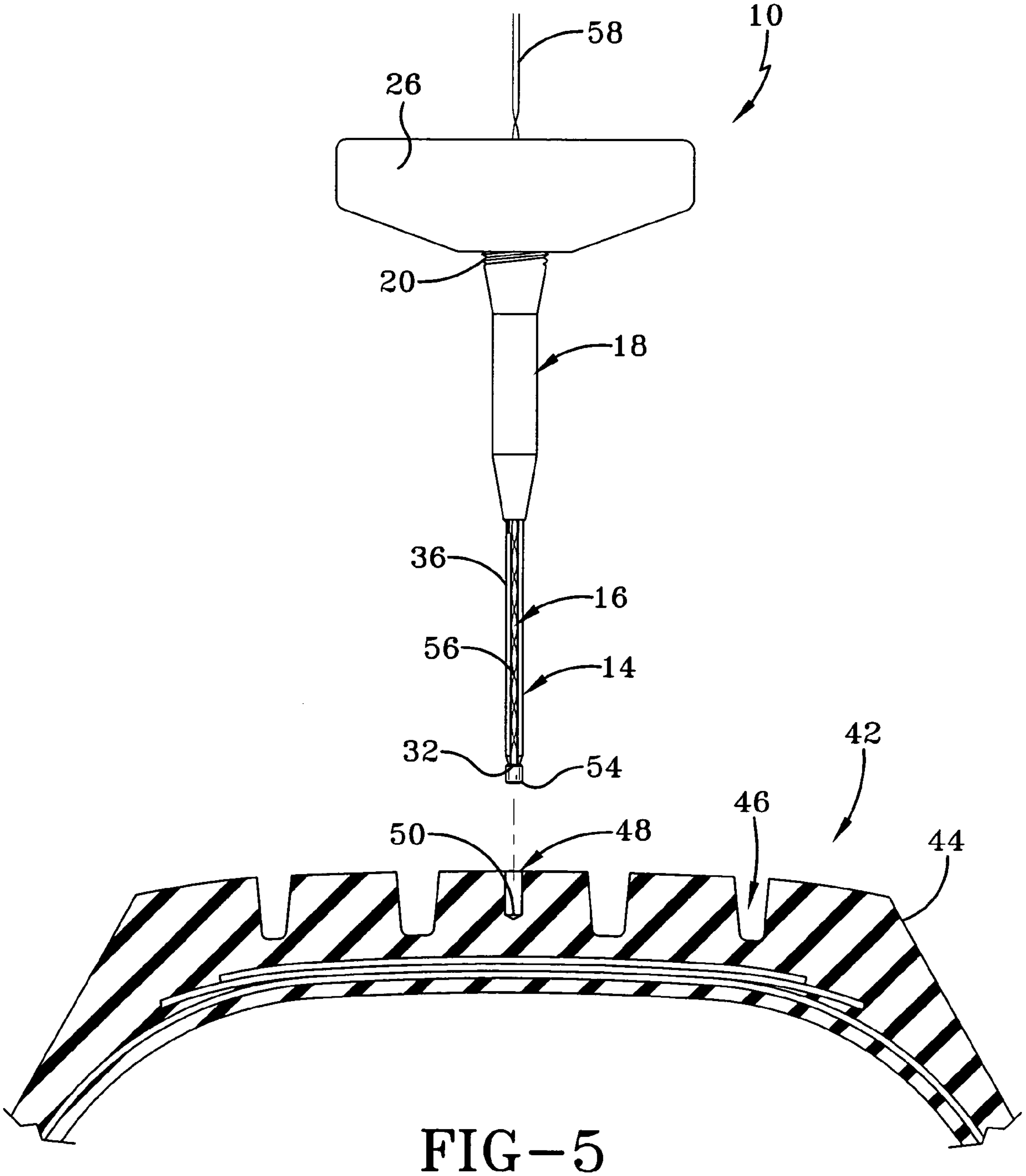
FIG. 5 is a schematic view of an intermediate point in the sensor insertion sequence showing the sensor positioned through the tool.
Figure 6:
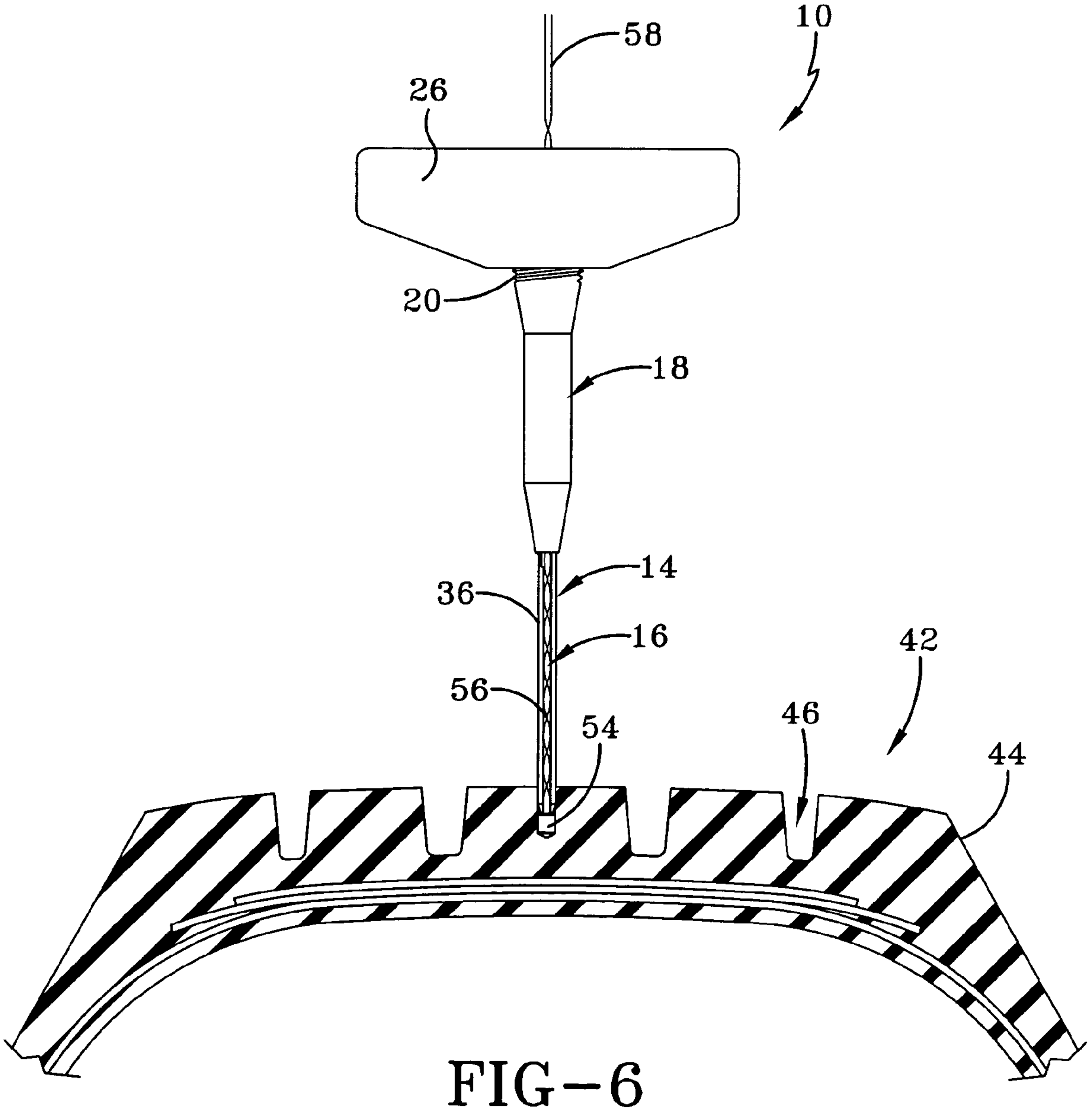
FIG. 6 is a schematic view of the sensor inserted within the tire tread bore.

FIG. 5 shows the sensor extending through the tool and the sensor body 54 poised for insertion into bore 48. An operator of the tool grasps flanges 24, 26 and moves the tip 14 and sensor body 54 downward into bore 54 until the sensor body 54 reaches its intended depth. An externally visible marking on the tip 14 may be made by scoring, ink, or other known methods, to mark the depth to which tip 14 must be inserted to place the sensor body 54 at its preferred depth within the bore 54. The tip 14 pushes the sensor body 54 to the desired depth. Should the diameter of the bore create interference, the tool, in order to overcome such resistance, may be conveniently rotated by grasping and turning the tool by means of the flanges 24, 26 as the tip 14 is pushed deeper into the bore.

Figure 7:
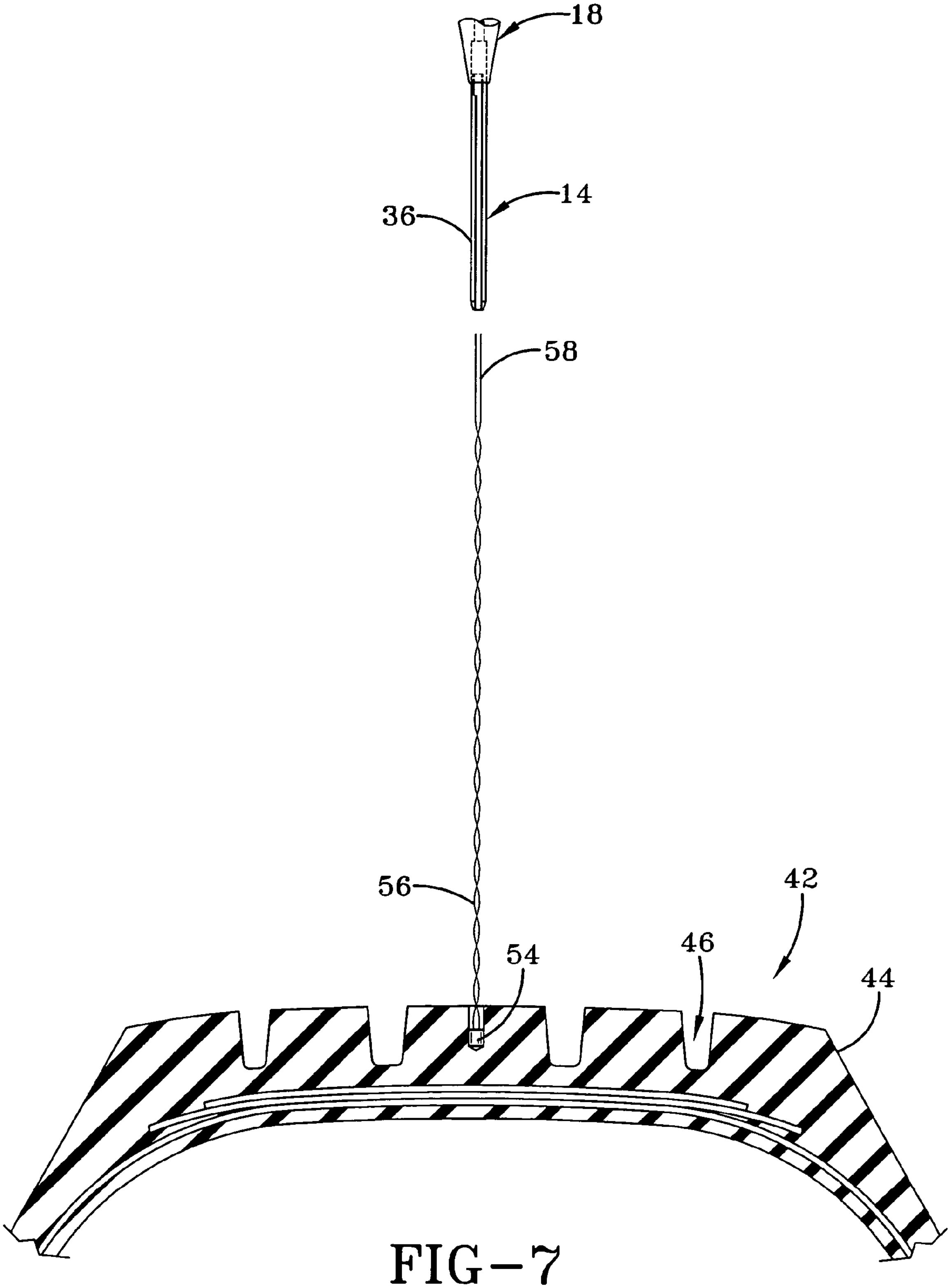
FIG. 7 is a schematic view of the fully inserted sensor within the tire tread bore and the tool fully withdrawn therefrom.
Figure 8:
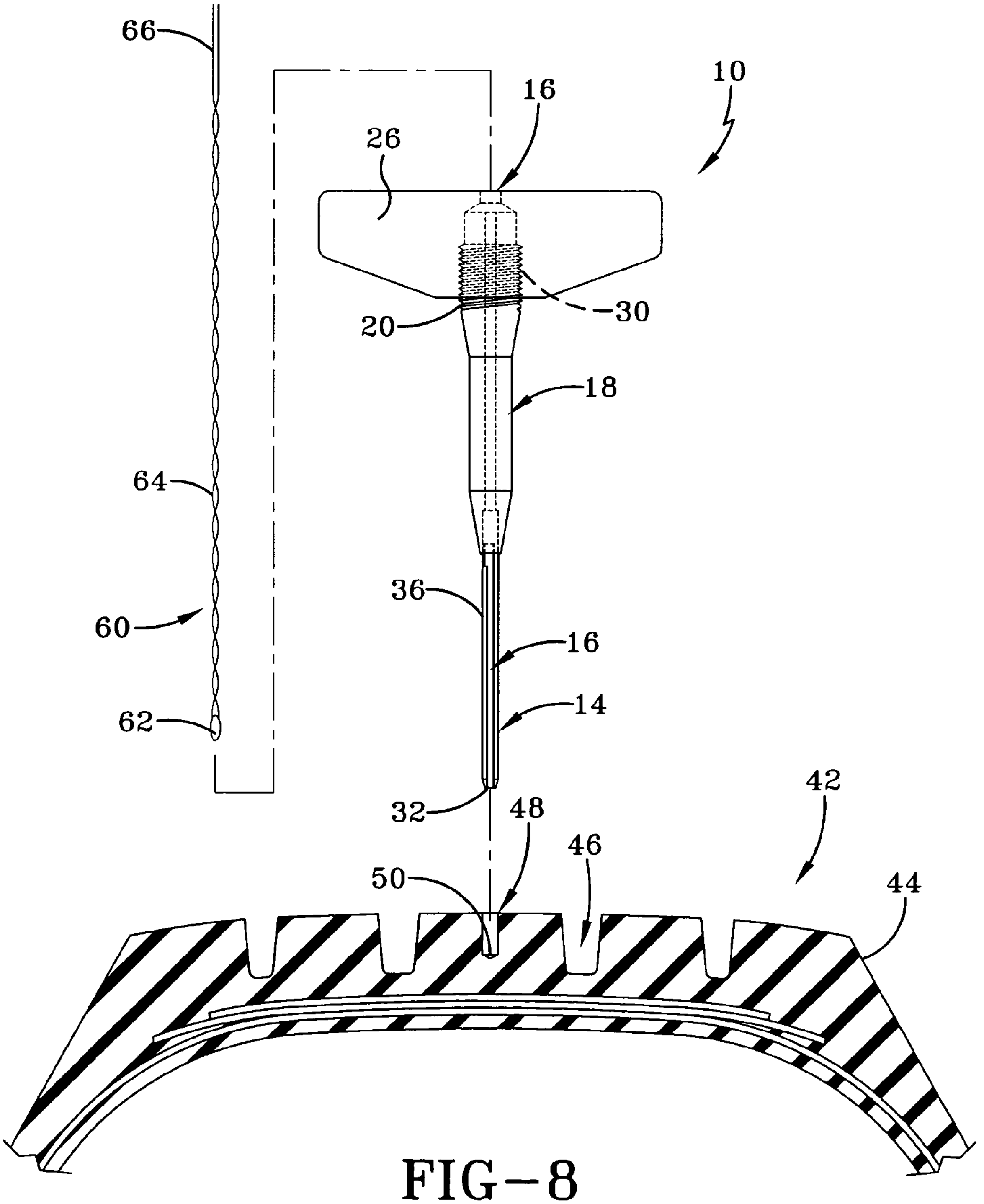
FIG. 8 is a schematic view of the thermocouple insertion sequence showing the tool, a tire tread, and a thermocouple in an initial mutual relationship.
Figure 9:
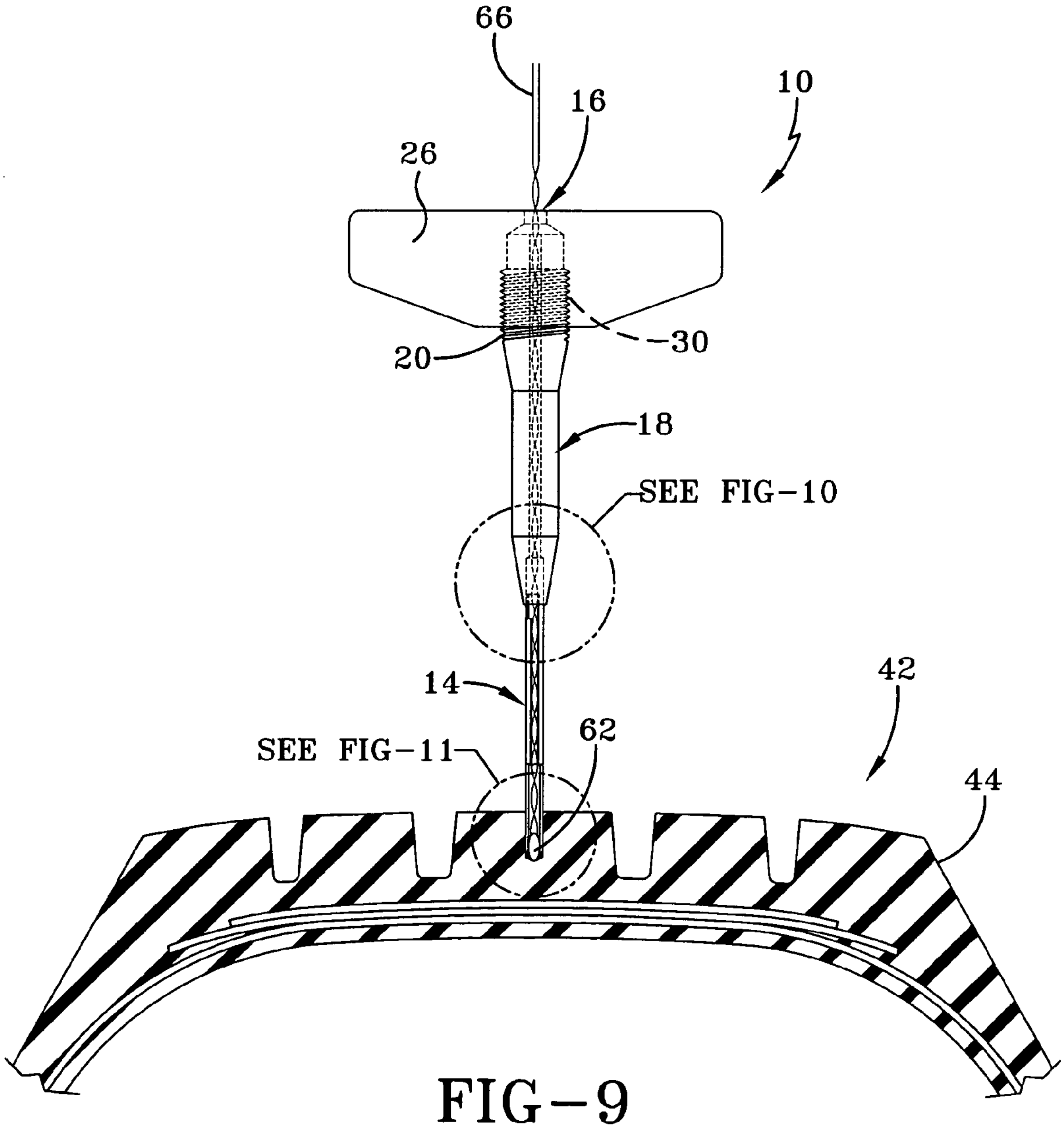
FIG. 9 is a schematic view of the fully inserted thermocouple within the tire tread bore.

Once the sensor is properly positioned at its optimal depth, as will be apparent from FIG. 7, the tip 14 is withdrawn from the bore. The free ends 58 leading to the sensor body 54 may then be connected to appropriate testing apparatus in conventional manner. The tool may be re-used in subsequent procedures for other bore locations on the same tire tread or on other tires. The procedure, while particularly useful in the implantation of a sensor in a tire tread, may also be used in other applications where the insertion of a sensor into a bore is required.

The subject tool 10 is further intended to be useful in a second mode of operation, as illustrated in FIGS. 8–12, inclusive. With reference to FIGS. 8–12, the tool may be used to implant a thermocouple device 66 into a similarly formed bore 48 in a tire tread 44 if desired. The thermocouple comprises a thermocouple device 62 having leads 64 extending therefrom to free lead ends 66. To insert the thermocouple 66 into the bore 48, the tip 14 of the tool 10 is first inserted into the bore until the forward tip end bottoms. Thereafter, the thermocouple is inserted into passageway 16 from the rearward end of the tool handle and moved downward through the passageway until thermocouple device 62 enters the bore 48.

Due to the fragile construction of typical thermocouple devices commercially available, it is desirable to terminate the progress of the device 62 just as it reaches the bottom of the bore 48. Engagement of the device 62 against the inner terminal surface of bore 48 may otherwise cause damage to the device. In order to ascertain when the device 62 has reached its terminal depth within the bore 48, a marking may be placed on the leads 64 as indicated at numeral 68 of FIG. 10. The marking 68 to the leads 64 will arrive at the window 40 through tip 14 just as the device 62 reaches its optimal depth within bore 48. By visually detecting the presence of the marking 68 through the window 40, the operator of the tool is able to monitor the insertion depth to which the device 62 is positioned.

Figure 10:
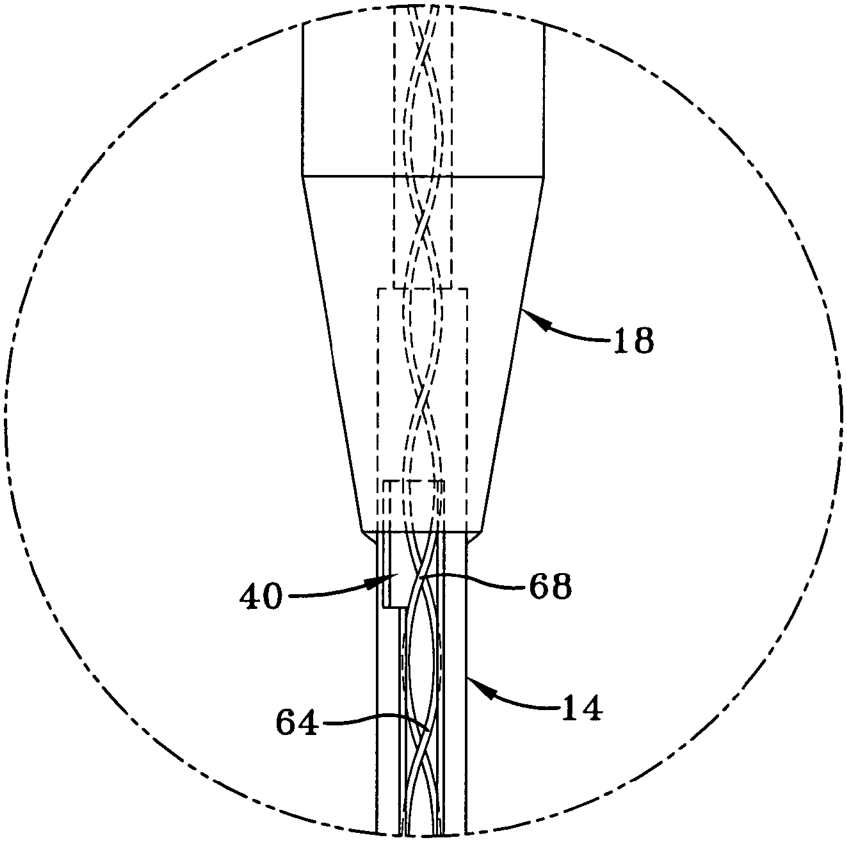
FIG. 10 is an enlarged schematic view of the region in FIG. 9 depicting the presence of the thermocouple leads at the tool tip window.
Figure 11:
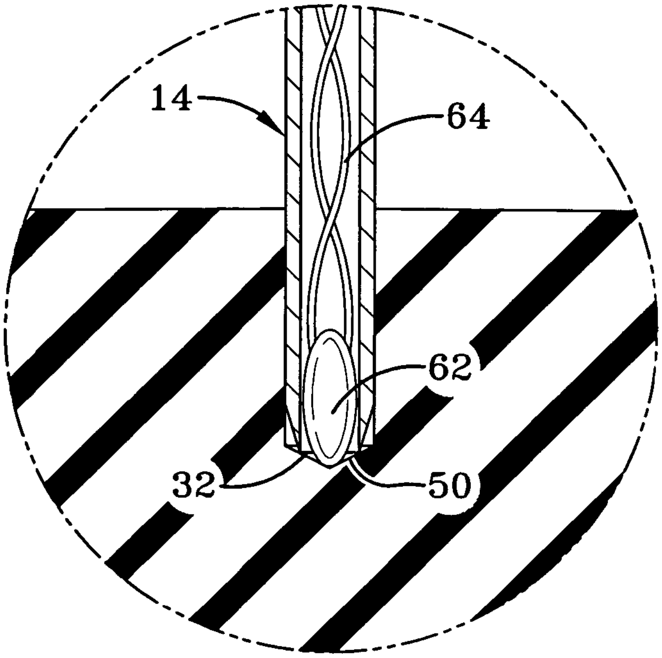
FIG. 11 is an enlarged schematic view of the region in FIG. 9 depicting the location of the thermocouple within the tire tread bore.
Figure 12:
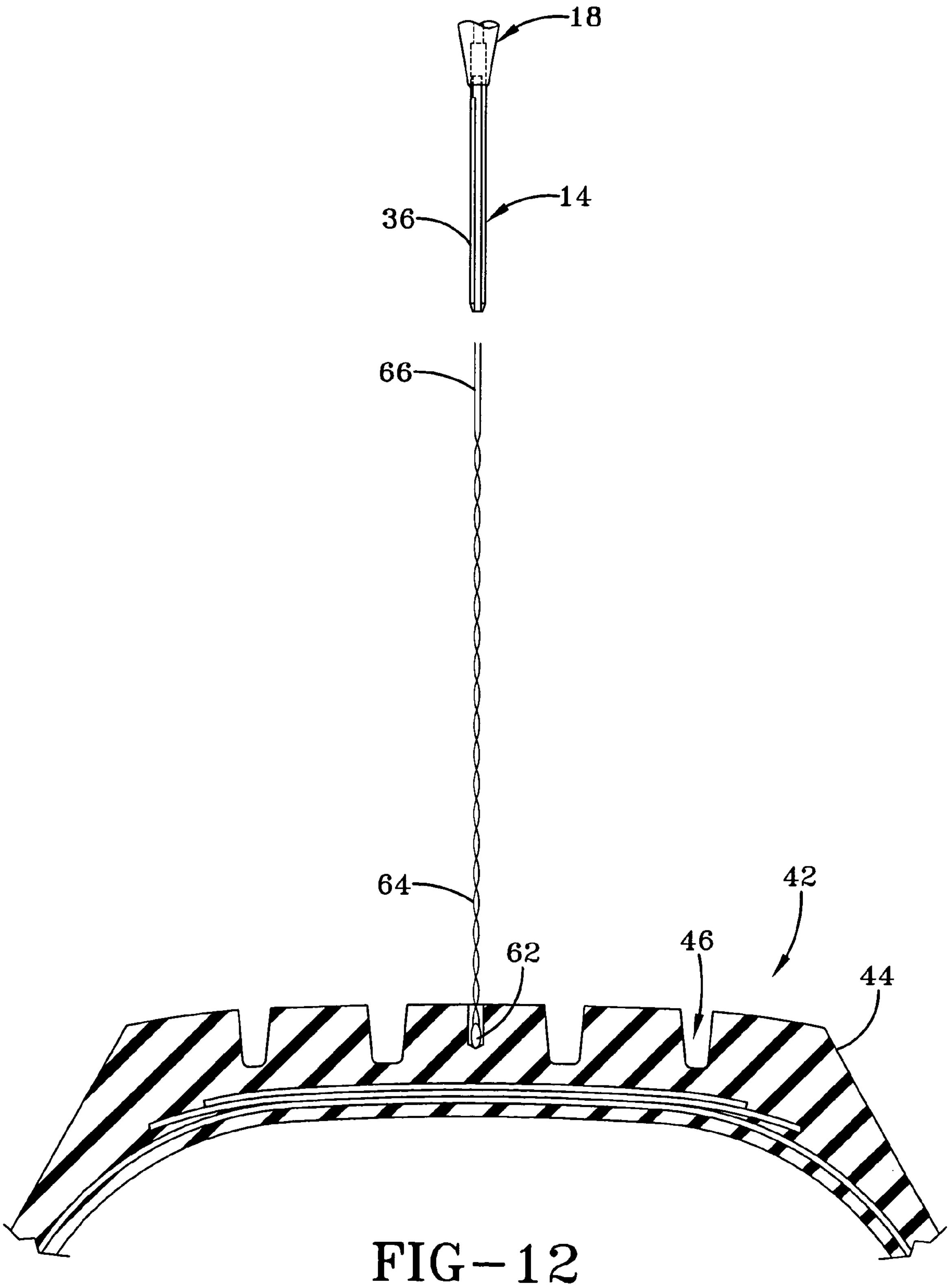
FIG. 12 is a schematic view of the fully inserted thermocouple within the tire tread bore and the tool fully withdrawn therefrom.

FIG. 11 depicts the device 62 reaching the bottom surface 50 of the bore 48 just as the marking 68 on leads 64 reach the observation window 40 as shown in FIG. 10. The thermocouple 62 may thus be delivered into the bore within the safe confines of the tip 14 and accurately and safely positioned at its intended depth by the operation of the subject tool.

From the foregoing, it will be appreciated that the tool has the advantage of providing an observation window to track the insertion depth of a thermocouple. The use of a machined roll pin provides added durability when inserting through the steel belts of a tire. The roll pin tip can be replaced easily when the tip becomes worn because the opposite end is threaded and screwed into the T-shaped handle. The T-shaped handle provides an ergonomic means for tool utilization and advantageous mechanical advantage by which to rotate and insert the tool tip into a pre-drilled bore. The tool is economical to manufacture and inexpensive to utilize. Use of the tool further is effective in overcoming the rubber’s inherent properties which may otherwise complicate insertion of a sensor or thermocouple.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. For example, with no intent to list all changes and modifications that will be apparent to those skilled in the art, the tool may be formed into alternative configurations using more or fewer component parts. The material from which the tool components are manufactured may be changed if desired. In addition, the tool may be useful in the insertion of devices other than thermocouples or sensors. It is, therefore, to be understood that changes can be made in the particular embodiments described which will be within the full intended scope of the invention as defined by the following appended claims.

What is claimed is:

1. A tool for the insertion and release of a sensor to a predetermined depth within a bore, comprising:

a handle at a first tool end;

an elongate tool tip affixed to the handle at an opposite tool end, the tip having an axial passageway extending to a remote tip end;

the remote tip end having a sensor receiving socket in communication with the tip axial passageway, the socket being configured to push the sensor into the bore to the predetermined depth and release the sensor at the predetermined depth as the remote tip socket is withdrawn from the bore.

2. A tool according to claim 1, wherein the handle includes an axial passageway in axial alignment with the tip axial passageway, the aligned handle and tip passageways being dimensioned to receive sensor leads there through from the remote tip end to an outer end of the handle passageway.

3. A tool according to claim 1 wherein the tip is detachable from the handle.

4. A tool according to claim 1 wherein the handle includes a substantially T-shaped gripping portion.

5. A tool according to claim 1 wherein the tip includes an observation window spaced a predetermined distance from the remote tip end, the observation window having a transverse orientation with the axial passageway, and the window positioned allowing visual communication with the tip passageway and sensor leads disposed from the sensor along the tip axial passageway.

6. A tool according to claim 5 wherein the tip further comprises an axial slit communicating with the tip passageway and extending between the tip end and the observation window.

7. A tool according to claim 1, wherein the length of the tip is substantially equal the depth of the bore.

8. A tool according to claim 1, wherein the handle is substantially T-shaped.

9. A tool according to claim 1, wherein the tool tip is an elongate roll pin having opposite slits extending in to the tip passageway.

10. A tool for the insertion and release of a sensor to a predetermined depth within a bore, comprising:

a handle at a first tool end;

an elongate tool tip extending from the handle to a remote tip end;

an axial passageway extending through the tip and handle to the first tool end; and a sensor receiving socket at the tip remote end in communication with the axial passageway, the socket being configured to push the sensor into the bore to the predetermined depth and release the sensor at the predetermined depth as the remote tip socket is withdrawn from the bore.

11. A tool according to claim 10, wherein the tip includes an observation window positioned between the tip remote end and the handle in transverse orientation with the axial passageway, the window positioned to allow visual communication with the axial passageway and sensor leads extending from the sensor along the axial passageway.

12. A tool according to claim 11, wherein the length of the tip is substantially equal the depth of the bore.

13. A tool according to claim 12, wherein the tip is formed as a roll pin having opposite axial slits extending in to the tip passageway and extending between the remote tip end and the observation window.

* * * * *